United States Patent [19]
Irpino

[11] Patent Number: 5,692,417
[45] Date of Patent: Dec. 2, 1997

[54] APPARATUS FOR EXTENDING THE REACH OF AN OPERATOR

[76] Inventor: Joseph Irpino, 6121 Ridge Top La., Garland, Tex. 75043

[21] Appl. No.: 602,377

[22] Filed: Feb. 16, 1996

[51] Int. Cl.⁶ .................................................. H01K 3/32
[52] U.S. Cl. ............................................. 81/53.12; 81/53.1
[58] Field of Search ............................... 81/53.1, 53.11, 81/53.12; 294/64.1

[56] References Cited

U.S. PATENT DOCUMENTS

| | | | |
|---|---|---|---|
| 1,540,143 | 6/1925 | Pierpoint | 81/53.12 |
| 4,901,606 | 2/1990 | Christensen | 81/53.12 X |
| 4,911,039 | 3/1990 | Lubbock et al. | 81/53.1 |

*Primary Examiner*—James G. Smith

[57] ABSTRACT

An apparatus for extending the reach of an operator is disclosed having a handle with at least one switch to indicate on/off and forward/reverse, a head having a bi-directional, battery powered motor and a longitudinally extendible shaft allowing electrical connection between the handle switch and the head motor. The head is adapted to be fully and flexibly pivotable and rotatable about the longitudinal axis of the shaft. Further disclosed is an assembly removably attached to the head in electrical connection to the handle switch and adapted to rotate by the motor. The assembly is adapted to grip a light bulb for insertion and/or removal from a socket, remove dust accumulation, polish, grip, remove, etc. other objects or perform other operations.

17 Claims, 1 Drawing Sheet

APPARATUS FOR EXTENDING THE REACH OF AN OPERATOR

FIELD OF THE INVENTION

This invention relates generally to an apparatus for extending the reach of an operator and more specifically to a motorized fixture maintenance apparatus.

BACKGROUND

There has long been a need to insert and remove light bulbs in light fixtures beyond the reach of an operator. People have solved this problem in the past by standing on ladders, erecting, scaffolding or using mechanical or electrical extensions adapted to grip a bulb and rotate the bulb into or out of a bulb socket.

U.S. Pat. No. 1,128,453 is a mechanical extension having a pivotably rotatable head designed to mechanically turn the bulb. Some limitations to this system include the cumbersome and difficult nature of use, and the less effective and efficient operation as the bulb is further from the operator's reach.

U.S. Pat. No. 1,201,506 is also a mechanical device for placing and removing light bulbs having a head pivotably rotatable but has the additional limitations that require the handle to rotate in order to rotate the head, as well as poor rotation as the angle of the head increases.

U.S. Pat. No. 4,901,606 is a motorized light bulb changer yet has limitations as to the head rotation, wasteful battery life, and cumbersome control and extension capabilities.

SUMMARY OF THE INVENTION

In accordance with the present invention, an apparatus for extending the reach of an operator having at least a handle with at least one switch to indicate on/off and forward/reverse, a head having a bi-directional motor, a shaft allowing electrical connection between the handle switch and the head motor, wherein the head is adapted to be fully and flexibly pivotable and rotatable about the longitudinal axis of the shaft. According to the preferred embodiment, the invention further has an assembly removably attached to the head in electrical connection to the handle switch and adapted to rotate by the motor.

In a preferred embodiment of the invention the shaft is longitudinally extendible and the motor is powered by one or more batteries which may be rechargeable and adapted to fit in the handle. In the preferred embodiment of the invention, the assembly is adapted to grip a light bulb for insertion and/or removal from a socket, remove dust accumulation or to polish. Alternately, the assembly may be adapted to grip or remove other objects or perform other operations.

OBJECTS OF THE INVENTION

It is an object of the present invention to provide access to a fixture from virtually any position in a light-weight, motorized, hand-held and easily operated manner.

It is another object of the present invention to allow multiple maintenance operations such as light bulb removal/insertion, dust removal or polishing in the same base apparatus with minimal adjusting.

It is yet a further object of the invention to provide easier access to motor functions and extension features.

BRIEF DESCRIPTION OF THE DRAWINGS

The disclosed invention will be described with reference to the accompanying drawing which shows an important sample embodiment of the invention and which is incorporated in the specification hereof by reference, wherein.

DETAILED DESCRIPTION OF THE PREFERRED EMBODIMENTS

Figure 1:
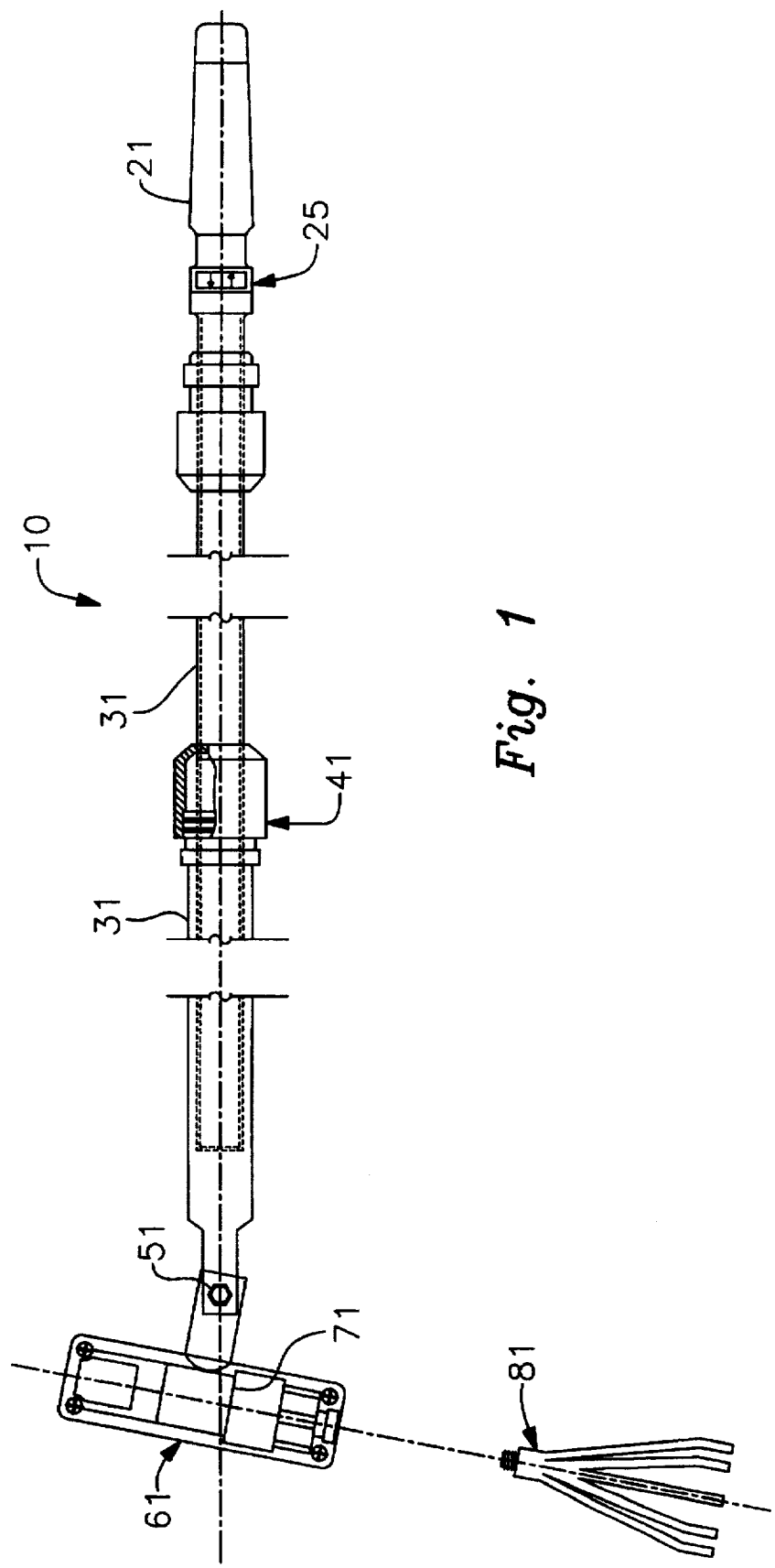
FIG. 1 is an exploded plan view of an apparatus according to the present invention.

Attention is now turned to FIG. 1 where there is shown a motorized apparatus for extending the reach of an operator shown at 10. Apparatus 10 is designed to be hand held through hand grip assembly 21, made from die cast rigid plastic shaped to fit comfortably in the hand of an operator. Similar hand held designs can be seen in hand held motorized tools currently being sold by Black & Decker™, Skil™ and other similar manufacturers, though the particular design of grip assembly 21 may be adapted to particular applications. In the preferred embodiment shown, grip assembly 21 is designed to house one or more batteries (not shown) for motor power. These batteries may be of the rechargeable NiCad type. If the rechargeably battery type is used, the grip assembly 21 may have recharging leads or connections (not shown) adapted to fit into a recharging apparatus (not shown) in a similar fashion to those on the market. Grip assembly 21 may also be adapted to receive rechargeable battery packs that are recharged in a separate charging base not shown.

As the motor, described hereinbelow, is adapted to run in forward and reverse, grip assembly 21 includes switch 25 adapted to indicate a forward position and a reverse position. In the preferred embodiment, upon depressing one side of the switch with the forward indicator, the motor would be activated in the forward position. Reverse would operate in a similar fashion. The switch may be of any suitable form and may include for example one switch for forward/reverse and a separate switch for on/off.

To extend the reach of an operator beyond the arm's length, shaft 31, preferably made of aluminum tubing is connected to grip assembly 21, though any suitable material providing adequate stiffness may be employed. Extendibility of the apparatus is provided by shaft 31 being constructed in multiple pieces as shown with one section sized to slide within another section and connected thereto by a frictionally threaded clamp fitting 41 of conventional design.

Head 61 houses a motor with a motor assembly and gear block housing 71, the details of which are conventionally known and not shown. The head 61 is preferably made from die cast rigid plastic, and motor assembly and gear block housing 71 is adapted to work in a bi-directional, forward/reverse mode and is controlled by switch 25 on grip assembly 21 through wires running within shaft 31 (not shown).

In accordance with an important feature of the invention, to allow complete rotation about the longitudinal axis of shaft 31 and rotation along the axial direction of shaft 31, bolt and wingnut assembly 51 allows angular rotation and clamp firing 41 allows axial rotation of shaft 31. Both assembly 51 and clamp fitting 41 may be of varying tightness so as to restrict movement of head 61 with respect to grip assembly 21 or to permit limited or complete movement of head 61 with respect to grip assembly 21. This movement may be advantageous when trying to reach hard to get at places and positions. In an alternate construction not shown, the position of head 61 may be controlled through motors by controls on grip assembly 21 connected in any of conventionally known manners.

Assembly 81 is shown adapted to connect to head 61 through a threaded screw of conventional design. Alternate connecting means may be employed such as snap-on assemblies, bolt, adhesive, etc. Assembly 81 is shown as a spring friction light bulb gripper of conventional design though, may be a duster, polisher, picker, or other construction designed for multiple operations. Assembly 81 is adapted to rotate through connection with motor assembly and gear block housing 71 and controlled by switch 25 on grip assembly 21.

Block housing 71 may be designed to sense excessive torque levels and shut off the motor before a pre-determined torque is reached. This will prevent any excessive force being applied by assembly 81 on a light bulb or other fixture element. Such sensing is conventionally known and not shown.

While the invention has been described in connection with a preferred embodiment, it will be understood that it is not intended to be limited to the particular embodiment shown but intended, on the contrary, to cover the various alternative and equivalent constructions included within the spirit and scope of the appended claims.

What is claimed is:

1. An apparatus for extending the reach of an operator comprising:
   a handle having at least one switch to indicate on/off and forward/reverse;
   a head having a bi-directional motor;
   a shaft, having a longitudinal axis, allowing electrical connection between said handle switch and said head motor;
   said head being freely pivotable and rotatable about the longitudinal axis of said shaft; and
   an assembly removably attached to said head in electrical connection with said handle switch and adapted to rotate by the motor.

2. An apparatus as claimed in claim 1 wherein said shaft is longitudinally extendible.

3. An apparatus as claimed in claim 1 wherein said motor is powered by one or more batteries.

4. An apparatus in claim 3 wherein said one or more batteries are rechargeable.

5. An apparatus as claimed in claim 3 where said handle is adapted to house said one or more batteries.

6. An apparatus as claimed in claim 1 wherein said assembly further includes a light bulb gripper adapted to grip a light bulb or other object.

7. An apparatus as claimed in claim 1 wherein said assembly further includes a duster adapted to remove dust accumulation.

8. An apparatus as claimed in claim 1 wherein said assembly further includes a polisher adapted to polish.

9. An apparatus for extending the reach of an operator comprising:
   a handle having at least one switch to indicate on/off and forward/reverse;
   a head having a bi-directional motor;
   a shaft, having a longitudinal axis, allowing electrical connection between said handle switch and said head motor;
   said head being freely pivotable and rotatable about the longitudinal axis of said shaft; and
   an assembly attached to said head in electrical connection with said handle switch and adapted to rotate by the motor.

10. An apparatus as claimed in claim 9 wherein said shaft is longitudinally extendible.

11. An apparatus as claimed in claim 9 wherein said motor is powered by one or more batteries.

12. An apparatus in claim 11 wherein said one or more batteries are rechargeable.

13. An apparatus as claimed in claim 11 where said handle is adapted to house said one or more batteries.

14. An apparatus as claimed in claim 11 wherein said assembly further includes a light bulb gripper adapted to grip a light bulb or other object.

15. An apparatus as claimed in claim 9 wherein said assembly further includes a duster adapted to remove dust accumulation.

16. An apparatus as claimed in claim 9 wherein said assembly further includes a polisher adapted to polish.

17. An apparatus as claimed in claim 14 wherein said motor is responsive to a torque sensor.

* * * * *